(12) United States Patent
Hiraki et al.

(10) Patent No.: US 6,926,795 B2
(45) Date of Patent: Aug. 9, 2005

(54) PLASTIC-COATED METAL PLATE FOR CAR BODY

(75) Inventors: Tadayoshi Hiraki, Kanagawa-ken (JP); Takeshi Yawata, Kanagawa-ken (JP); Akira Tominaga, Kanagawa-ken (JP); Tadashi Watanabe, Kanagawa-ken (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 253 days.

(21) Appl. No.: 10/302,930

(22) Filed: Nov. 25, 2002

(65) Prior Publication Data

US 2003/0072949 A1 Apr. 17, 2003

Related U.S. Application Data

(62) Division of application No. 09/549,494, filed on Apr. 14, 2000, now Pat. No. 6,565,966.

(30) Foreign Application Priority Data

Apr. 14, 1999 (JP) ........................................... 11-106840

(51) Int. Cl.$^7$ ................................................. B32B 31/20
(52) U.S. Cl. ..................... 156/309.6; 156/150; 428/457
(58) Field of Search ................................. 428/457, 458; 156/150, 151, 308.2, 309.6; 180/89.1

(56) References Cited

U.S. PATENT DOCUMENTS

| 4,789,566 A | 12/1988 | Tatsuno et al. |
| 6,136,449 A | 10/2000 | Furuuchi et al. |
| 6,395,162 B1 * | 5/2002 | Watanabe et al. ............. 205/50 |

FOREIGN PATENT DOCUMENTS

| EP | 982413 A2 * | 3/2000 | ........... C25D/13/22 |
| JP | 11-235783 | 8/1999 | |

* cited by examiner

*Primary Examiner*—Blaine Copenheaver
*Assistant Examiner*—John L. Goff
(74) *Attorney, Agent, or Firm*—Wenderoth, Lind & Ponack, L.L.P.

(57) ABSTRACT

The present invention provides a plastic-coated metal plate for an automobile exterior plate which is a laminate metal plate coated on both faces or one face of the metal plate with a plastic layer, wherein the plastic layer has a surface tension of at least 30 mN/m, an elongation percentage of at least 30% at a tensile rate of 20 mm/minute/20° C. and a rupture strength of at least 600 kg/cm$^2$ at a tensile rate of 20 mm/minute/20° C., and a part for a major external face side in a car body, wherein the above plastic-coated metal plate is cut, molded and joined to form the part for a major external face side in a car body, and a metal-exposed part thereof is coated by electrodeposition.

17 Claims, No Drawings

PLASTIC-COATED METAL PLATE FOR CAR BODY

This application is a Divisional application of Ser. No. 09/549,494, filed Apr. 14, 2000, now U.S. Pat. No. 6,565,966.

The present invention relates to a plastic-coated metal plate which is used for forming a car body and has an excellent chipping resistance.

In car bodies of passenger cars and light cars, a part to which equipments such as an engine and a chassis are not installed and which is composed mainly of sheet metal is called "a shell body" and is composed usually of "a main body" composed of an underbody, a side member, a roof, a cowl, an upper back and a lower back and "an outer covered part" such as a hood, a front balance, a front fender, a cowl louver, doors and a luggage (back doors).

These main body and outer covered part have so far been formed by cutting, molding and assembling metal plates into sizes and shapes of the respective constitutional parts, immersing them in a cation electrodeposition paint bath to coat the front sides, back sides and end faces thereof to form primer coat paint films and then applying an intermediate coat paint and a top coat paint on the outside parts.

In recent years, however, step saving, energy saving and a reduction in $CO_2$ in a coating line are strongly desired in coating car bodies. In addition thereto, a chipping resistance and a corrosion resistance of a combined paint film are requested to be further improved. In order to elevate this chipping resistance, it is proposed to provide a barrier coat for forming a visco-elastic paint film in a layer between these paint films, but there are the defects that a coating step is added and the production cost goes up.

Intensive investigations repeated by the present inventors in order to solve the problems described above in car bodies have resulted in finding that the problems described above can be solved at a stroke by using a metal plate coated with a plastic film having specific physical property values, and thus they have come to complete the present invention.

Then, provided according to the present invention is a plastic-coated metal plate for an automobile exterior plate which is a laminate metal plate coated on both faces or one face of the metal plate with a plastic layer, wherein the plastic layer has a surface tension of at least 30 mN/m, an elongation percentage of at least 30% at a tensile rate of 20 mm/minute/20° C. and a rupture strength of at least 600 kg/cm² at a tensile rate of 20 mm/minute/20° C.

The plastic-coated metal plate of the present invention for an automobile exterior plate shall be explained below in detail.

The plastic-coated metal plate according to the present invention can be applied to passenger cars and light cars and can similarly be applied as well to trucks, buses, autobicycles, special installation automobiles and the like.

Those which have so far been used for car bodies can similarly be used as the metal plate for coating with plastics and, materials therefor include, for example, metal plates of iron, steel, stainless steel, aluminum, copper and alloys containing these metals, and metal plates obtained by plating the surfaces thereof with zinc, zinc/nickel and iron, and they can be used by working into the form of a coil or a cut plate. The metal plates have suitably a thickness falling in a range of usually 0.3 to 2.0 mm, particularly 0.5 to 1.0 mm. The surfaces of these metal plates are preferably subjected in advance to suitable polishing treatment, degreasing treatment and phosphate treatment in order to elevate an adhesive property with a plastic layer and an anticorrosive property.

Plastics used for coating the metal plates shall not specifically be restricted in terms of materials therefor, and there can be used, for example, conventionally known thermoplastic resins or thermosetting resins including polyolefin resins such as polyethylene and polypropylene, polyester resins such as polyethylene terephthalate (PET), polycarbonate resins, epoxy resins, vinyl acetate resins, vinyl chloride resins, fluorine-containing resins, polyvinyl acetal resins, polyvinyl alcohol resins, polyamide resins, polystyrene resins, acryl resins, polyurethane resins, phenol resins and polyether resins. These resins may suitably contain color pigments and extender pigments.

These plastics in a state that they are coated on the surface of the metal plate in a layer have a surface tension of at least 30 mN/m, particularly 35 to 55 mN/m and more particularly 38 to 50 mN/m, an elongation percentage of at least 30%, particularly 50 to 300% and more particularly 60 to 250% at a tensile rate of 20 mm/minute/20° C. and a rupture strength of at least 600 kg/cm², particularly at least 1000 kg/cm² and preferably 1000 to 2500 kg/cm² at a tensile rate of 20 mm/minute/20° C. ("mN" described above is an abbreviation of milli-Newton). If the plastic layer has a surface tension of smaller than 30 mN/m, the adhesive property with an intermediate coat paint film and a top coat paint film which are formed on the surface thereof is reduced, and interlayer peeling is caused in a certain case. Also, if the plastic layer has an elongation percentage of smaller than 30%, the paint film does not become satisfactorily flexible. Further, if it has a rupture strength of smaller than 600 kg/cm², deformation and cracking rupture of the paint film are liable to be caused by an impact force, and therefore there is the possibility that the chipping resistance is reduced.

A method for allowing the plastic layer formed on the metal plate to fall in characteristic values having the ranges described above includes, for example, methods in which 1) a composition of the plastic layer is suitably selected; 2) the plastic layer is treated with chemicals or organic solvents or coated with a primer, a coupling agent or a surfactant; 3) the plastic layer is subjected on the surface thereof to grafting or colloid treatment; and 4) the plastic layer is subjected to irradiation with UV rays, vacuum discharge treatment, flame treatment, ozone treatment, plasma contact treatment or corona discharge treatment. The physical property values of the plastic layer can readily be controlled in the ranges described above by carrying out these methods suitably in combination. Among them, the corona discharge treatment can be carried out, for example, by carrying out three pass treatment of 40 to 50 KHZ at a maximum output of 1.0 Kw by means of a high frequency power source CG-102 type (manufactured by Kasuga Co., Ltd.).

The surface tension ($\gamma S$) of the plastic layer is a value obtained by dropping deionized water and paraffin on the surface of the prepared plastic layer to determine a contact angle ($\theta$) to the plastic layer and applying it to the following equation. The contact angle ($\theta$) can be measured at 20° C. by means of CONTACT ANGLE METER (trade name, manufactured by KYOWA KAIMEN KAGAKU Co., Ltd.):

surface tension of deionized water:
$\gamma LW$=72.8 mN/m
$\gamma LWd$=29.1 mN/m
$\gamma LWp$=43.7 mN/m
$\theta w$: contact angle of deionized water surface tension of paraffin:
$\gamma LP$=24.4 mN/m
$\theta p$: contact angle of paraffin $$\gamma Sd = \tfrac{1}{4} \cdot \gamma LP (1+\cos \theta p)^2$$

$$\gamma Sp=[(1+\cos\theta w)\times\gamma LW-2\sqrt{\gamma LWd\cdot\gamma Sd}]^2/4\times\gamma LWp$$

$$\gamma S=\gamma Sd+\gamma Sp$$

The elongation percentage and the rupture strength of the plastic layer are values obtained by forming a plastic layer on a tin plate by a suitable method, separating it by a mercury amalgam method and then measuring the plastic layer of length 20 mm and width 5 mm at a tensile rate of 20 mm/minute and a temperature of 20° C. by means of a tensile tester (TENSILON UTM-II-20, trade name, manufactured by TOYO BOLDWIN Co., Ltd.).

The metal plate can be coated with the plastic film by conventionally known methods. It can be coated, for example, by such a method that a film-shaped or sheet-shaped plastic molded by extrusion molding, injection molding, calendar molding or compression molding is adhered on a metal plate; plastic which is molten by heating is extruded into a film or sheet, and it is adhered on a metal plate by pressing; or powdery plastic is adhered on a metal plate by fluid dipping or electrostatic coating and molten by heating.

The metal plate may be one on which no electrodepostion paint has been applied.

The plastic film is coated on the surface of the metal plate positioned at least on the outside of an automobile part but can be coated, if desired, on both surfaces. The plastic layer coated on the metal plate has a thickness falling suitably in a range of usually 1 to 100 $\mu$m, particularly 3 to 75 $\mu$m and more particularly 5 to 50 $\mu$m.

In coating the metal plate with the plastic, an adhesive is preferably applied in advance on either of the metal plate and/or the plastic film or both of them in order to enhance an adhesive property between both. Such adhesive includes, for example, thermosetting adhesives containing at least one resin selected from bisphenol A type epoxy resins, resol type epoxy resins, acryl resins, aminoplast resins, polyester resins, urethane resins and polysiloxane. Further, there can also be used as the adhesive, triazinethiol base compounds such as 2,4,6-trimercapto-s-triazine, 2-dibutylamino-4,6-dimercapto-s-triazine, 2,4,6-trimercapto-s-triazine monosodium salt and 2,4,6-tri-mercapto-s-triazine trisodium salt.

The plastic-coated metal plate for an automobile exterior plate according to the present invention can be prepared by coating both surfaces or a single surface of the metal plate with the plastic layer in such a manner as described above. The plastic-coated metal plate thus produced is cut, molded and joined, whereby there can be formed, the "main body" composed of an underbody, a side member, a roof, a cowl, an upper back and a lower back and/or the "outer covered part" such as a hood, a front balance, a front fender, a cowl louver, doors and a luggage (back doors).

To be specific, the "main body" is composed mainly of an underbody, a side member, a roof, a cowl, an upper back and a lower back. The underbody means floor parts for a passenger compartment (cabin) and a luggage boot and is a general term for a front under-body, a front floor and a rear floor. The side member is to combine with a front body, a roof panel and an underbody to form a side face of a cabin and prevent bending and torsion of the vehicle. The cowl is a panel for connecting longitudinal and lateral pillars. The upper back is a panel for connecting right and left quarter panels (rear fenders) at a rear part of a car body to form an outside face of the car body.

All or a part of these parts can be produced by using the plastic-coated metal plate for an automobile exterior plate according to the present invention. For example, the plastic-coated metal plate of the present invention is cut to an intended shape and size and molded by pressing by a conventionally known method by means of a press working machine to produce the "main body". The main body molded in such a manner as described above is coated at least on the outside thereof with the plastic layer, and the end face part and back side of the cut coated metal plate remain uncoated, but the back side part may be coated with the plastic layer in such a manner as described above.

The "outer covered part" is composed mainly of a hood, a front balance, a front fender, a cowl louver, doors and a luggage (back doors), and in order to form these parts, the plastic-coated metal plate for an automobile exterior plate according to the present invention is cut and molded by pressing by a conventionally known method, followed by combining them by an adhesive, welding and bolting to thereby form the "outer covered part". The outer covered part thus obtained is coated at least on the outside thereof with the plastic layer, and the cut steel plate remains uncoated on the end face part and the back side thereof, so that the metal is exposed, but the back side thereof may be coated with the plastic layer in such a manner as described above.

The "shell body" can be formed by combining the "main body" with the "outer covered part" which are produced in such a manner as described above by using the plastic-coated metal plate for an automobile exterior plate according to the present invention. Equipments such as an engine and a chassis are usually not installed on this shell body in car bodies of passenger cars and light cars.

Only the outer covered part can be formed from the plastic-coated metal plate for an automobile exterior plate according to the present invention, and this can be mounted on a main body produced by a conventional method, whereby the shell body can be formed.

Metal is sometimes exposed in the end face part and the back face part of the shell body produced in such a manner as described above, and therefore in order to elevate a corrosion resistance in these parts, they are preferably immersed in, for example, an electrodeposition paint bath and apply an electric current to form primer paint films on these parts. Either an anionic type or a cationic type can be used as the electrodeposition paint and usually, a cationic type electrodeposition paint providing a good corrosion resistance is preferably used.

Known ones can be used as the cationic electrodeposition paint and, for example, a paint containing a base resin having a hydroxyl group and a cationic group and a block polyisocyanate compound (a cross-linking agent) is suitably used. In this case, conventionally known ones can be used for the base resin and include, for example, reaction products of polyepoxy resins with cationizing agents; products obtained by protonating polycondensation products of polycarboxylic acids and polyamines with acids (refer to U.S. Pat. No. 2,450,940); products obtained by protonating polyaddition products of polyisocyanate compounds, polyols and mono- or poly-amines with acids; products obtained by protonating copolymers of acryl base or vinyl base monomers containing a hydroxyl group and an amino group with acids (refer to Japanese Patent Publication No. 12395/1970 and Japanese Patent Publication No. 12396/1970); and products obtained by protonating adducts of polycarboxylic acids to alkyleneimines with acids (refer to U.S. Pat. No. 3,403,088). Among them, a base resin prepared by reacting a cationizing agent with a polyepoxy resin obtained by reacting a polyphenol compound with epichlorohydrin is particularly preferred because of an excellent corrosion resistance thereof The cationizing agent includes, for example, amine compounds such as primary amines, secondary amines, tertiary amines and polyamines. Further, basic compounds such as ammonia, hydroxylamine, hydrazine, hydroxylethylhydrazine and N-hydroxylethylimidazoline may be used as the cationizing agent and allowed to be reacted with an epoxy group of a base resin, and a basic group formed thereby may be protonated into a cationic group with an acid.

Usually, an electrodeposition paint can be prepared by blending a base resin with a block polyisocyanate compound, then neutralizing a cationic group contained in the base resin with an acid compound such as acetic acid, formic acid, lactic acid and phosphoric acid and mixing and dispersing them with water. The pH in coating falls suitably in a range of usually 3 to 9, particularly 5 to 7, and the solid concentration falls suitably in a range of 5 to 30% by weight.

The cationic electrodeposition paint can suitably be compounded, if necessary, with a curing catalyst having a corrosion resistance such as hydroxides, oxides, organic acid salts and inorganic acid salts of metals selected from aluminum, nickel, zinc, strontium, lead, zirconium, molybdenum, tin, antimony, lanthanum, tungsten and bismuth; various color pigments; and precipitation preventives.

Electrodeposition is carried out, and a paint film thus formed is cure by heating. Then, an intermediate coat paint and a top coat paint which are known as paints for automobiles can suitably be applied on the surface of the plastic layer on the outer face side of the shell body.

The plastic-coated metal of the present invention described above can provide the effects described below. (1) The plastic-coated metal plate of the present invention for an automobile exterior plate comprising a metal plate coated with a plastic layer having a surface tension, an elongation rate and a rupture strength which fall in the specific ranges is excellent in a chipping property as compared with conventional painted metal plates and has a good interlayer adhesive property with an intermediate coat paint film and a top coat paint film which are coated on the surface thereof. (2) The shell body produced by using the plastic-coated metal plate of the present invention for an automobile exterior plate is coated at least on an outside face thereof with the plastic layer, and therefore an electrodeposition paint which is coated at a subsequent step can be reduced in a use amount thereof. In addition thereto, because of a smaller area of the non-electrodeposited part (metal-exposed part), the throwing power is elevated, and the corrosion resistance is improved particularly in the end face part.

The present invention shall more specifically be explained below with reference to examples and comparative examples. Both parts and percentage are based on weight, and a film thickness of a coated film is that of a cured coated film.

EXAMPLE 1

Both faces of a polyester film ("ESTER FILM E5100", trade name, manufactured by TOYOBO Co., Ltd.) having a film thickness of 16 $\mu$m were subjected to corona discharge treatment, and then a thermosetting polyester resin base adhesive (remark 1) was applied on one face thereof in a film thickness of 7 $\mu$m, followed by drying it by heating at 120° C. for 30 seconds and then rolling it up. An alloyed molten zinc-plating steel plate having a thickness of 0.8 mm and a plating amount of 45 g/m$^2$ (double side plating) was subjected to degreasing treatment and zinc phosphate chemical conversion treatment ("PB #3080 Treatment", trade name, manufactured by NIHON PARKERIZING Company, Limited), and then the polyester film described above was coated on one face thereof via an adhesive by thermocompression bonding and baked at 200° C. for 10 minutes.

(remark 1): thermosetting polyester resin base adhesive: adhesive solution having a solid content of about 30% prepared by mixing and dispersing 90 parts of "Elitel UE3200" (trade name, polyester resin manufactured by UNITIKA Ltd.) and 10 parts of "Duranate TPA100" (trade name, hexamethylenediisocyanate base polyisocyanate compound manufactured by ASAHI CHEMICAL INDUSTRY Co., Ltd.) in a mixed solvent (methyl ethyl ketone/toluene=50/50 weight ratio).

EXAMPLE 2

The foregoing polyester film used in Example 1 was changed to a hard vinyl chloride resin film (film thickness: 20 $\mu$m, "HISHILEX MB-S", trade name, manufactured by MITSUBISHI RAYON Co., Ltd.), and both sides thereof were not subjected to corona discharge treatment. Then, the thermosetting polyester resin base adhesive (remark 1) was applied on one face thereof in a film thickness of 7 $\mu$m, dried by heating at 120° C. for 30 seconds and then rolled up. The alloyed molten zinc-plating steel plate having a thickness of 0.8 mm and a plating amount of 45 g/m$^2$ (double side plating) was subjected to degreasing treatment and zinc phosphate chemical conversion treatment ("PB #3080 Treatment", trade name, manufactured by Nippon Parkerizing Co., Ltd.), and then the polyester film described above was coated on one face thereof via an adhesive by thermocompression bonding and baked at 200° C. for 10 minutes.

Comparative Example 1

The same procedure as in Example 1 was repeated, except that the corona discharge treatment provided on both faces of the polyester film in Example 1 was omitted.

Comparative Example 2

Both sides of a cold rolled steel plate having a thickness of 20 0.8 mm was subjected to alloyed molten zinc plating so that the plating amount became 45 g/m$^2$ and was then subjected to degreasing treatment and zinc phosphate chemical conversion treatment ("PB #3080 Treatment", trade name, manufactured by NIHON PARKERIZING Company, Limited). The metal plate thus treated was immersed in a bath of an electrodeposition paint ("Elecron #9600 Gray", trade name, manufactured by Kansai Paint Co., Ltd.), and an electric current was applied at a bath temperature of 28° C. and a voltage of 250 V for 3 minutes to carry out electrodeposition coating. It was pulled up from the bath, washed with water and then heated at 170° C. for 30 minutes to cure the paint film.

Performance Test Results

The test plates obtained in the examples and the comparative examples described above were used to evaluate a surface tension (mN/m), a rupture strength (kg/cm$^2$), an elongation percentage (%) and a chipping resistance of the plastic layer. The results thereof are shown in the following Table 1.

The surface tension, the rupture strength and the elongation percentage were measured by the methods described above.

The chipping resistance was determined by testing a composite paint film obtained by applying an intermediate coating paint (RUGA BAKE KPX-60, trade name, polyester-amino resin base, manufactured by Kansai Paint Co., Ltd.) in 25 μm on the surface of the plastic layer on the test plate, curing it by heating at 140° C. for 30 minutes, then further applying a white top coating paint (AMILAC WHITE, trade name, polyester-amino resin base, manufactured by Kansai Paint Co., Ltd.) in 35 μm and curing it by heating at 140° C. for 30 minutes. To be specific, "QGR-GRAVEIO METER" (trade name, manufactured by Q-PANEL Co., Ltd.) was used for the tester to blow about 50 g of No. 7 crushed stones against the painted surface at −20° C., an air pressure of about 4 kg/cm² and 90 degrees (angle). Then, an adhesive cellophane tape was adhered on the painted surface and quickly peeled off at 20° C. to visually observe a peeling state on the painted film in the impacted part of the peeled area. The mark ○ shows that scratches produced by impact are observed a little on the top coat paint film; the mark Δ shows that a lot of scratches produced by impact are observed on the top coat paint film, and scratches are observed a little as well on the exposed intermediate coat paint film; the mark X shows that a lot of scratches produced by impact are observed on both top coat and intermediate coat paint films, and peeling is observed a little as well on the exposed electrodeposition paint film; and the mark * shows that interlayer layer peeling of the paint films is observed.

TABLE 1

|  | Example | | Comparative Example | |
| --- | --- | --- | --- | --- |
|  | 1 | 2 | 1 | 2 |
| Surface tension (mN/m) | 47 | 40 | 25 | 46 |
| Rupture strength (kg/cm²) | 1750 | 1010 | 1750 | 700 |
| Elongation percentage (%) | 75 | 193 | 75 | 40 |
| Chipping resistance | ○ | ○ | X* | X |

What is claimed is:

1. A process for making a plastic-coated metal plate for an automobile exterior plate, which comprises adhering or pressing a plastic film or sheet on both faces or one face of a metal plate, on a surface of the metal plate either directly or with only adhesive interposed therebetween, the plastic film or sheet having a surface tension at least 30 mN/m, an elongation percentage at break of at least 30% at a tensile rate of 20 mm/minute/20° C. and a rupture strength of at least 1000 kg/cm² at a tensile rate of 20 mm/minute/20° C.

2. The process as described in claim 1, wherein the plastic film or sheet has a surface tension of 35 to 55 mN/m.

3. The process as described in claim 1, wherein the plastic film or sheet has an elongation percentage at break of 50 to 300% at a tensile rate of 20 mm/minute/20° C.

4. The process as described in claim 1, wherein the plastic film or sheet is coated on the surface of the metal plate positioned at least on the outside of an automobile part.

5. The process as described in claim 1, wherein the plastic film or sheet has a thickness of 1 to 100 μm.

6. The process as described in claim 1, wherein the plastic film or sheet has a thickness of 5 to 50 μm.

7. The process as described in claim 1, wherein the plastic film or sheet is laminated on the metal plate via a thermosetting adhesive.

8. A process for making a part for a major exterior face side an a car body, which comprises adhering or pressing a plastic film or sheet on both faces or one face of a metal plate on a surface of the metal plate either directly or with only adhesive interposed therebetween, the plastic film or sheet having a surface tension of at least 30 mN/m, an elongation percentage at break of at least 30% at a tensile rate of 20 mm/minute/20° C. and a rupture strength of at least 1000 kg/cm² at a tensile rate of 20 mm/minute/20° C.; cutting, molding and joining the resulting plastic-coated metal plate to form a part for a major exterior face side in a car body; and then coating a metal-exposed portion of said part by electrodeposition.

9. The process as described in claim 8, wherein the plastic film or sheet has a surface tension of 35 to 55 mN/m.

10. The process as described in claim 8, wherein the plastic film or sheet has an elongation percentage at break of 50 to 300% at a tensile raze of 20 mm/minute/20° C.

11. The process as described in claim 8, wherein the plastic film or sheet is coated on the surface of the metal plate positioned at least on the outside of an automobile part.

12. The process as described in claim 8, wherein the plastic film or sheet has a thickness of 1 to 100 μm.

13. The process as described in claim 8, wherein the plastic film or sheet has a thickness of 5 to 50 μm.

14. The process as described in claim 8, wherein the plastic film or sheet is laminated on the metal plate via a thermosetting adhesive.

15. The process as described in claim 8, wherein the part for the car body is a main body or an outer covered part.

16. The process as described in claim 8, wherein electrodeposition is carried out using a cationic type electrodeposition paint.

17. The process as described in claim 16, wherein the cationic type electrodeposition paint contains a base resin which is a reaction product of a polyepoxy resin with a cationizing agent and a cross-linking agent which is block polyisocyanate.

* * * * *